United States Patent
Kazmi et al.

(10) Patent No.: US 10,887,913 B2
(45) Date of Patent: Jan. 5, 2021

(54) SYSTEMS AND METHODS FOR CONTROLLING WIRELESS DEVICE FEEDBACK ON SECONDARY CELL ACTIVATION AND DEACTIVATION VIA THE UNLICENSED SPECTRUM

(71) Applicant: Telefonaktiebolaget LM Ericsson (publ), Stockholm (SE)

(72) Inventors: Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 160 days.

(21) Appl. No.: 16/092,487

(22) PCT Filed: Apr. 11, 2017

(86) PCT No.: PCT/IB2017/052092
§ 371 (c)(1),
(2) Date: Oct. 10, 2018

(87) PCT Pub. No.: WO2017/178973
PCT Pub. Date: Oct. 19, 2017

(65) Prior Publication Data
US 2020/0245354 A1    Jul. 30, 2020

Related U.S. Application Data

(60) Provisional application No. 62/321,044, filed on Apr. 11, 2016.

(51) Int. Cl.
H04W 74/08    (2009.01)
H04W 76/30    (2018.01)
(Continued)

(52) U.S. Cl.
CPC ....... *H04W 74/0808* (2013.01); *H04W 16/14* (2013.01); *H04W 56/0045* (2013.01); *H04W 76/30* (2018.02)

(58) Field of Classification Search
CPC ...... H04W 24/02; H04W 36/08; H04W 48/16
See application file for complete search history.

(56) References Cited

U.S. PATENT DOCUMENTS 10,257,855 B2 * 4/2019 Babaei ............... H04W 74/006
2015/0092707 A1    4/2015 Kwon

FOREIGN PATENT DOCUMENTS

EP     3 000 274 A1    3/2016
WO    2015 115034 A1    8/2015
(Continued)

OTHER PUBLICATIONS

Decision to Grant a Patent issued by the Japan Patent Office for Japanese Patent Application No. 2018-553446—dated Feb. 12, 2020.
(Continued)

*Primary Examiner* — Chandrahas B Patel
(74) *Attorney, Agent, or Firm* — Baker Botts, LLP

(57) ABSTRACT

A wireless device is configured to operate in at least a first serving cell on a first carrier, and a first downlink message requests that a second serving cell on a second carrier be added or released. In response to the first downlink message, the second serving cell on the second carrier is added or released. Within a time period starting from the time resource, wireless device transmits, on the second serving cell, a first uplink message indicating completion of the addition or release of the second serving cell. The time period starting from the time reserving source is of a length that is a function of at least one parameter related to a clear channel assessment (CCA) procedure.

26 Claims, 8 Drawing Sheets

(51) Int. Cl.
    *H04W 16/14*    (2009.01)
    *H04W 56/00*    (2009.01)

(56)            References Cited

FOREIGN PATENT DOCUMENTS

| WO | 2015 147720 A1 | 10/2015 |
| WO | 2015 169397 A1 | 11/2015 |
| WO | 2016 046756 A1 | 3/2016  |
| WO | 2016 048222 A1 | 3/2016  |
| WO | 2016 053174 A1 | 4/2016  |
| WO | 2016 047727 A1 | 7/2017  |

OTHER PUBLICATIONS

Communication Pursuant to Article 94(3) EPC issued by the European Patent Office for Application No. 17 720 227.2-1231—dated Feb. 26, 2020.
Notice of Reasons for Rejection (Office Action) issued by the Japanese Patent Office for Japanese Patent Application No. 2018-553446—dated Nov. 8, 2019.
PCT International Search Report for International application No. PCT/IB2017/052092—dated Jun. 29, 2017.
PCT Written Opinion of the International Searching Authority for International application No. PCT/IB2017/052092—dated Jun. 29, 2017.
Communication Pursuant to Article 94(3) EPC issued for Application No. 17 720 227.2-1231—dated Aug. 2, 2019.
Examination Report Under Sections 12 & 13 of the Patents Act, 1970 and the Patents Rules, 2003 issued for Application No. 201817038655—dated Jul. 1, 2020.

* cited by examiner

SYSTEMS AND METHODS FOR CONTROLLING WIRELESS DEVICE FEEDBACK ON SECONDARY CELL ACTIVATION AND DEACTIVATION VIA THE UNLICENSED SPECTRUM

PRIORITY

This nonprovisional application is U.S. National Stage Filing under 35 U.S.C. § 371 of International Patent Application Serial No. PCT/IB2017/052092 filed Apr. 11, 2017, and entitled "Systems and Methods for Controlling Wireless Device Feedback on Secondary Cell Activation and Deactivation Via the Unlicensed Spectrum" which claims priority to U.S. Provisional Patent Application No. 62/321,044 filed Apr. 11, 2016, both of which are hereby incorporated by reference in their entirety.

TECHNICAL FIELD

The present disclosure relates, in general, to wireless communications and, more particularly, systems and methods for controlling wireless device feedback on secondary cell activation and deactivation via the unlicensed spectrum.

BACKGROUND

License assisted access (LAA) or operation based on frame structure type 3 as specified in 3GPP TS 36.211, which was introduced in LTE Rel-13, refers to user equipment (UE) operation on at least one carrier in an unlicensed spectrum. One example of the unlicensed spectrum is Band 46, which may be used for WiFi access. For example, a UE can be configured with carrier aggregation with a primary cell (PCell) in Band 1 (licensed spectrum) and a secondary cell (SCell) in Band 46 (unlicensed spectrum). An eNB operating in the unlicensed band only transmits signals which may be used for UE measurements using discovery reference symbols (DRS). Unlike common reference signals (CRSs) as disclosed in Release 8, DRS is not transmitted in every subframe and is instead transmitted periodically. For example, DRS may be transmitted every 160 ms.

Moreover, before the eNB transmits DRS, the eNB may perform listen before talk (LBT) procedures to check that no other node (such as another eNB or a WiFi access point) is transmitting in the unlicensed spectrum. This means that, from a UE perspective, the eNB may be unable to transmit any particular DRS transmission. In certain regions, LBT functionality is required from a regulatory point of view to ensure fair coexistence of different radios and access technologies on the unlicensed band.

In Release 14, in addition to the downlink (DL) operation in the unlicensed spectrum as described above, uplink (UL) operation is being introduced. This means that a UE may be configured with UL transmissions on one or more SCells in the unlicensed spectrum and perform UL LBT if needed.

According to the LBT procedure, the transmitter in unlicensed spectrum (e.g. base station in case of DL or the user equipment in case of UL) needs to listen on the carrier before it starts to transmit. If the medium is free (referred sometimes as LBT being successful), the transmitter may transmit. Conversely, if the medium is busy such as when some other node is transmitting (referred to sometimes as LBT being unsuccessful), the transmitter cannot transmit, and the transmitter can try again at a later time. Therefore, the LBT procedure enables a clear channel assessment (CCA) check before using the channel. Based on the CCA, if the channel is found to be clear then then LBT is considered to be successful. But if the channel is found to be occupied then the LBT is considered to be failure also known as LBT failure. The LBT failure requires the network node not to transmit signals in the same and/or subsequent subframes. Exact subframes and also the number of subframes where transmission is forbidden depend on specific design of LBT scheme.

Due to LBT, a transmission in an unlicensed band may be delayed until the medium becomes free again. And in case there is no coordination between the transmitting nodes (which often is the case), the delay may appear random.

In the simplest form, LBT is performed periodically with a period equal to certain units of time. For example, one unit of time may include one transmission time interval (TTI), one time slot, one subframe, or another unit. The duration of listening in LBT is typically on the order of a few μsec to tens of μsec. Typically, for LBT purposes, each LTE subframe is divided in two parts. In the first part, the listening takes place. The second part carries data if the channel is seen to be free. The listening occurs at the beginning of the current subframe and determines whether or not data transmission will continue in this subframe and a few next subframes. Hence, the data transmission in a subframe P until subframe P+n is determined by the outcome of listening during the beginning of subframe P. The number n depends on system design and/or regulatory requirements.

A random access (RA) procedure in LTE is performed to enable the UE to gain uplink access under certain scenarios. For example, a RA procedure may be performed under the following scenarios:

During an initial access in idle mode;
For RRC connection re-establishment such as, for example, after radio link failure, handover failure, or another connection failure;
After a UE has lost uplink synchronization;
Due to data arrival when a UE in connected mode does not retain UL synchronization (such as after a long discontinuous reception (DRX), for example);
During handover;
To facilitate positioning measurements such as, for example, eNB Rx-Tx time difference measurement, which in turn is used for deriving the timing advance;
For adding primary secondary cell (PSCell) in dual connectivity;
For activating SCell via PUCCH;

In LTE, RA can be contention-based or non-contention-based. For LAA, currently only non-contention based RA is being discussed (contention based random access is not precluded though for standalone LAA).

Contention-based RA procedures can only be carried out on PCell and PSCell, while non-contention-based RA procedures can be carried out on PCell, one or two activated SCell(s), and PSCell.

Both contention-based and non-contention-based RA mechanisms are multi-step procedures. In a first step, the UE randomly sends a RA preamble during the RACH opportunity to the eNB. The RA preamble is selected from a set of those configured for the cell and provided to the eNB such as, for example, by means of system information. During the second step, the network responds to the UE with at least a RA preamble identifier or initial uplink grant in a random access response (RAR) message. During the third step, the UE uses the initial allocation received in RAR to transmit further details related to the connection request aka message 3 (msg3). In msg3, the UE also sends its identifier, which is echoed by the eNode B in the 'contention resolution message' during the fourth and final step. The contention resolution is considered successful if the UE detects its own identity in the contention resolution message. Otherwise, the UE reattempts RA.

In non-contention-based RA, the eNB first assigns a 'random access preamble.' In the next step, the UE sends the assigned preamble during the RACH opportunity to the eNB. In the last step, the network responds to the UE with at least a RA preamble identifier, initial uplink grant, timing advance, etc. in the random access response (RAR) message.

A multi-carrier serving setup or release procedure may be used. Herein, a multi-carrier serving cell setup refers to a procedure which enables the network node to at least temporarily setup or release of a secondary serving cell (SCell) at the UE for multi-carrier operation such as, for example, the use of a SCell in CA-capable UE, PSCell in dual connectivity (DC), etc. Herein, the serving setup or release procedure or command can perform any one or more of:

Configuration of SCell(s) (also known as, SCell addition);
De-configuration of SCell(s) (also known as, SCell release);
Activation of SCell(s);
Deactivation of SCell(s);
Setting up of PSCell in DC;
Release of PSCell in DC;

The configuration procedure, which may include the configuration or deconfiguration of SCell and/or addition/release of PSCell, is used by the serving radio network node to configure a multicarrier UE capable with one or more SCells, PSCell, or other serving cells. On the other hand, the de-configuration procedure is used by the eNB to de-configure or remove one or more already configured serving cells. The configuration or de-configuration procedure is also used to change the current multi-carrier configuration. For example, the configuration or de-configuration procedure may be used for increasing or decreasing the number of SCells or for swapping the existing SCells with new ones.

The serving radio network node can activate one or more deactivated serving cells or deactivate one or more with one or more serving cells on the corresponding configured secondary carriers. The PCell is always activated. Therefore, SCell can be activated or deactivated.

In an existing solution, the UE in carrier aggregation operation can be requested to activate SCell and send a valid CSI (e.g., CQI with non-zero CQI index) for the activated SCell also on the activated SCell. This is called as PUCCH SCell activation procedure. This procedure is specified for SCell belonging to licensed carrier. There is currently no procedure for PUCCH SCell when the SCell operates in unlicensed carrier, which is subjected to UL LBT. If the existing solution is applied and LBT fails, the UE fails to perform PUCCH SCell activation. The UE behavior is unclear and may result in that the network may not be able to use PUCCH SCell operation on the unlicensed carrier.

SUMMARY

To address the foregoing problems with existing solutions, disclosed is systems and methods for controlling wireless device feedback on secondary cell activation and deactivation via the unlicensed spectrum.

According to certain embodiments, a method by a wireless device for performing addition or release of a serving cell includes receiving a first downlink message in a time resource. The wireless device is configured to operate in at least a first serving cell on a first carrier, and the first downlink message requests that a second serving cell on a second carrier be added or released. In response to the first downlink message, the second serving cell on the second carrier is added or released. Within a time period starting from the time resource, wireless device transmits, on the second serving cell, a first uplink message indicating completion of the addition or release of the second serving cell. The time period starting from the time resource is of a length that is a function of at least one parameter related to a clear channel assessment (CCA) procedure.

According to certain embodiments, a wireless device is provided for performing addition or release of a serving cell. The wireless device includes processing circuitry configured to receive, from a network node, a first downlink message in a time resource. The wireless device is configured to operate in at least a first serving cell on a first carrier. The first downlink message requests that a second serving cell on a second carrier be added or released. In response to the first downlink message, the wireless device adds or releases the second serving cell on the second carrier. Within a time period starting from the time resource, the wireless device transmits a first uplink message indicating completion of the addition or release of the second serving cell. The first uplink message is transmitted on the second serving cell. The time period starting from the time resource is of a length that is a function of at least one parameter related to a clear channel assessment (CCA) procedure performed by the wireless device on the second serving cell during the time period.

According to certain embodiments, a method by a network node is provided for performing addition or release of a serving cell. The method includes transmitting, to a wireless device configured to operate in at least a first serving cell on a first carrier, a first downlink message in a time resource. The first downlink message requests that the wireless device add or release a second serving cell on a second carrier. Within a time period starting from the time resource, the network node receives, from the wireless device and on the second serving cell, a first uplink message indicating completion of the addition or release of the second serving cell. At least one operational task is performed based on the first uplink message. The time period starting from the time resource is of a length that is a function of at least one parameter related to a clear channel assessment (CCA) procedure performed by the wireless device on the second serving cell during the time period.

According to certain embodiments, a network node is provided for performing addition or release of a serving cell. The network node includes processing circuitry configured to transmit, to a wireless device configured to operate in at least a first serving cell on a first carrier, a first downlink message in a time resource. The first downlink message requests that the wireless device add or release a second serving cell on a second carrier. Within a time period starting from the time resource, a first uplink message indicating completion of the addition or release of the second serving cell is received from the wireless device on the second serving cell. The time period starting from the time resource is of a length that is a function of at least one parameter related to a clear channel assessment (CCA) procedure performed by the wireless device on the second serving cell during the time period. The network node performs at least one operational task is based on the first uplink message.

Certain embodiments of the present disclosure may provide one or more technical advantages. For example, according to certain embodiments, a wireless device performing carrier aggregation (CA) or direct connectivity (DC) operations may be able to activate or deactivate a SCell within a specified time even when the wireless device has to apply listen-before-talk (LBT) in the uplink (UL) of the SCell. Another technical advantage may include enabling a wireless device performing CA or DC operations to transmit an indication such as, for example, valid CSI, for the activated or deactivated on a cell where no UL LBT is applied if the wireless device is unable to send the indication within a specified time period. Specifically, certain embodiments may allow the wireless device to send the CSI on a cell associated with the licensed carrier. This may ensure that the network node becomes aware of the activation or deactivation status of the SCell as early as possible. Still another technical advantage may be the ability, in DC, to add or release a primary SCell (PSCell) within a specified time period even if the wireless device is required to perform UL LBT on the PSCell.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
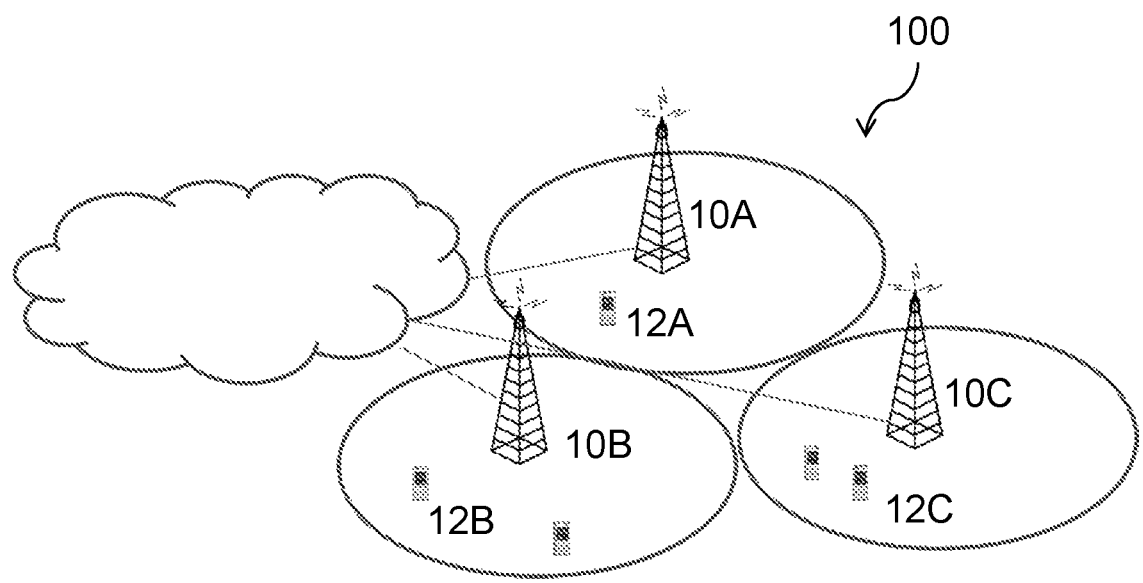
FIG. 1 illustrates an exemplary wireless network for performing an addition or release of a secondary cell, in accordance with certain embodiments.

Certain embodiments of the present disclosure may provide solutions for controlling wireless device feedback on secondary cell activation and deactivation via the unlicensed spectrum. Particular embodiments are described in FIGS. 1-10 of the drawings, like numerals being used for like and corresponding parts of the various drawings.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "a particular embodiment, "an example embodiment," and other such references, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network node is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station or other network apparatus can perform various functions described herein.

FIG. 1 illustrates an exemplary wireless network 100 for controlling wireless device feedback on secondary cell activation and deactivation via the unlicensed spectrum, in accordance with certain embodiments. Although the described solutions may be implemented in any appropriate type of telecommunication system supporting any suitable communication standards and using any suitable components, particular embodiments of the described solutions may be implemented in an LTE network.

As shown in FIG. 1, the example wireless network 100 may include one or more instances of wireless communication devices 12 (e.g., conventional user equipments (UEs), machine type communication (MTC)/machine-to-machine (M2M) UEs, or other wireless devices such as those discussed in more detail below) and one or more radio access nodes 10 (e.g., eNodeBs or other base stations or network nodes such as those discussed in more detail below) capable of communicating with these wireless communication devices 12 along with any additional elements suitable to support communication between wireless communication devices 12 or between a wireless communication device 12 and another communication device (such as a landline telephone). Although the illustrated wireless communication devices may represent communication devices that include any suitable combination of hardware and/or software, these wireless communication devices may, in particular embodiments, represent devices such as the example wireless communication device illustrated in greater detail by FIGS. 2 and 3. Similarly, although the illustrated radio access node may represent network nodes that include any suitable combination of hardware and/or software, these nodes may, in particular embodiments, represent devices such as the example radio access node illustrated in greater detail by FIGS. 4 and 5.

More specifically, wireless network 100 includes wireless communication devices 12A-C, which may be interchangeably referred to as wireless communication devices 12, wireless devices 12, or UEs 12, and radio access nodes 10A-C, which may be interchangeably referred to as radio access nodes 10, network nodes 10, or eNodeBs (eNBs) 10. A wireless device 12 may communicate with network nodes 10 over a wireless interface. For example, wireless device 12 may transmit wireless signals to one or more of network nodes 10, and/or receive wireless signals from one or more of network nodes 10. The wireless signals may contain voice traffic, data traffic, control signals, and/or any other suitable information. In some embodiments, an area of wireless signal coverage associated with a network node 10 may be referred to as a cell. In some embodiments, wireless devices 12 may have D2D capability. Thus, wireless devices 12 may be able to receive signals from and/or transmit signals directly to another wireless device 12. For example, wireless device 12A may be able to receive signals from and/or transmit signals to wireless device 12B.

In certain embodiments, network nodes 10 may interface with a radio network controller (not depicted in FIG. 1). The radio network controller may control network nodes 10 and may provide certain radio resource management functions, mobility management functions, and/or other suitable functions. In certain embodiments, the functions of the radio network controller may be included in network node 10. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 12. Wireless devices 12 may exchange certain signals with the core network node using the non-access stratum layer. In non-access stratum signaling, signals between wireless devices 12 and the core network node may be transparently passed through the radio access network. In certain embodiments, network nodes 10 may interface with one or more network nodes over an internode interface. For example, network nodes 10A and 10B may interface over an X2 interface.

As described above, example embodiments of network 100 may include one or more wireless devices 12 and one or more different types of network nodes capable of communicating (directly or indirectly) with wireless devices 12. Wireless device 12 may refer to any type of wireless device communicating with a node and/or with another wireless device in a cellular or mobile communication system. Examples of wireless device 12 include a radio communication device, a target device, a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, a low-cost or low-complexity UE, a sensor equipped with UE, a customer premises equipment (CPE), an Internet of Things (IoT) device, or another device that can provide wireless communication. A wireless device 12 may also be referred to as UE, a station (STA), a device, or a terminal in some embodiments.

Also, in some embodiments, generic terminology, "radio network node" (or simply "network node") is used. It can be any kind of network node that communicates with a wireless device and/or another network node. Example network nodes may include a NodeB, base station (BS), radio base station, multi-standard radio (MSR) radio node such as MSR BS, eNodeB (eNB), Master eNB (MeNB), Secondary eNB (SeNB), a network node belonging to a Master Cell Group (MCG) or Secondary Cell Group (SCG), network controller, radio network controller (RNC), base station controller (BSC), multi-cell/multicast coordination entity (MCE), relay node, donor node controlling relay, base transceiver station (BTS), access point (AP), radio access point, remote radio unit (RRU), remote radio head (RRH), transmission points, transmission nodes, nodes in distributed antenna system (DAS), core network node (e.g. Mobile Switching center (MSC), Mobile Management Entity (MME), etc.), Operations & Maintenance (O&M), Operations Support System (OSS), Self-Organizing Network (SON), positioning node (e.g. E-SMLC), MDT, or any suitable network node. The term "radio node" used herein may also be used to denote a UE or a radio network node.

Example embodiments of network nodes 10, wireless devices 12, and other network nodes (such as radio network controller or core network node) are described in more detail with respect to FIGS. 2-3, 4-5, and 10, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 12 and network nodes 10, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques described herein are applicable to both LAA LTE and standalone LTE operation in license-exempt channels. The described techniques are generally applicable for transmissions from both network nodes 10 and wireless devices 12.

Figure 2:
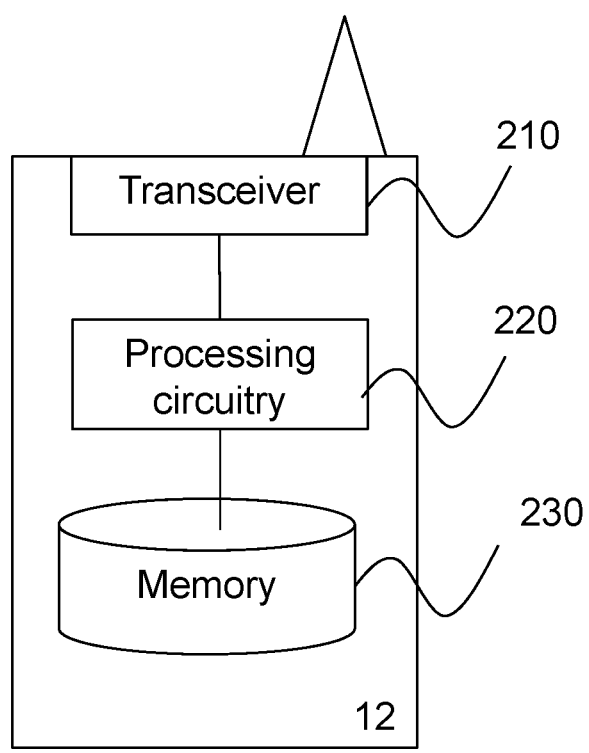
FIG. 2 illustrates an exemplary wireless device for performing an addition or release of a secondary cell, in accordance with certain embodiments.

FIG. 2 illustrates an example wireless device 12 for controlling wireless device feedback on secondary cell activation and deactivation via the unlicensed spectrum, in accordance with certain embodiments. As depicted, wireless device 12 includes transceiver 210, processing circuitry 220, and memory 230. In some embodiments, transceiver 210 facilitates transmitting wireless signals to and receiving wireless signals from network node 10 (e.g., via an antenna), processing circuitry 220 executes instructions to provide some or all of the functionality described above as being provided by wireless device 12, and memory 230 stores the instructions executed by processing circuitry 220. Examples of a wireless device 12 are provided above.

Processing circuitry 220 may include any suitable combination of hardware and software implemented in one or more modules to execute instructions and manipulate data to perform some or all of the described functions of wireless device 12. In some embodiments, processing circuitry 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 12 may include additional components beyond those shown in FIG. 2 that may be responsible for providing certain aspects of the wireless device's functionality, including any of the functionality described above and/or any additional functionality (including any functionality necessary to support the solution described above).

Figure 3:
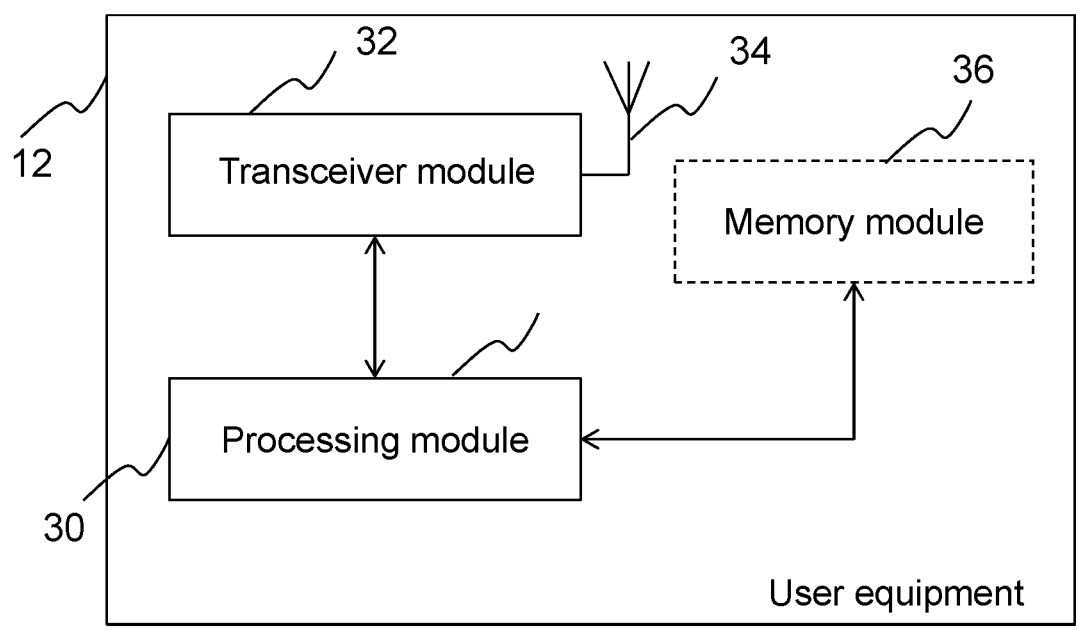
FIG. 3 illustrates another exemplary wireless device for performing an addition or release of a secondary cell, in accordance with certain embodiments.

FIG. 3 illustrates a block diagram of another example wireless device 12, which may include a UE or other wirelessly connected device that can be used in one or more of the non-limiting example embodiments described. The UE 12 comprises a processing module 30 that controls the operation of the UE 12. The processing module 30 is connected to a receiver or transceiver module 32 with associated antenna(s) 34 which are used to receive signals from or both transmit signals to and receive signals from a base station 10 in the network 2. To make use of discontinuous reception (DRX), the processing module 30 can be configured to deactivate the receiver or transceiver module 32 for specified lengths of time. The user equipment 12 also comprises a memory module 36 that is connected to the processing module 30 and that stores program and other information and data required for the operation of the UE 12. In some embodiments, the UE 12 may optionally comprise a satellite positioning system (e.g. GPS) receiver module 38 that can be used to determine the position and speed of movement of the UE 12.

Figure 4:
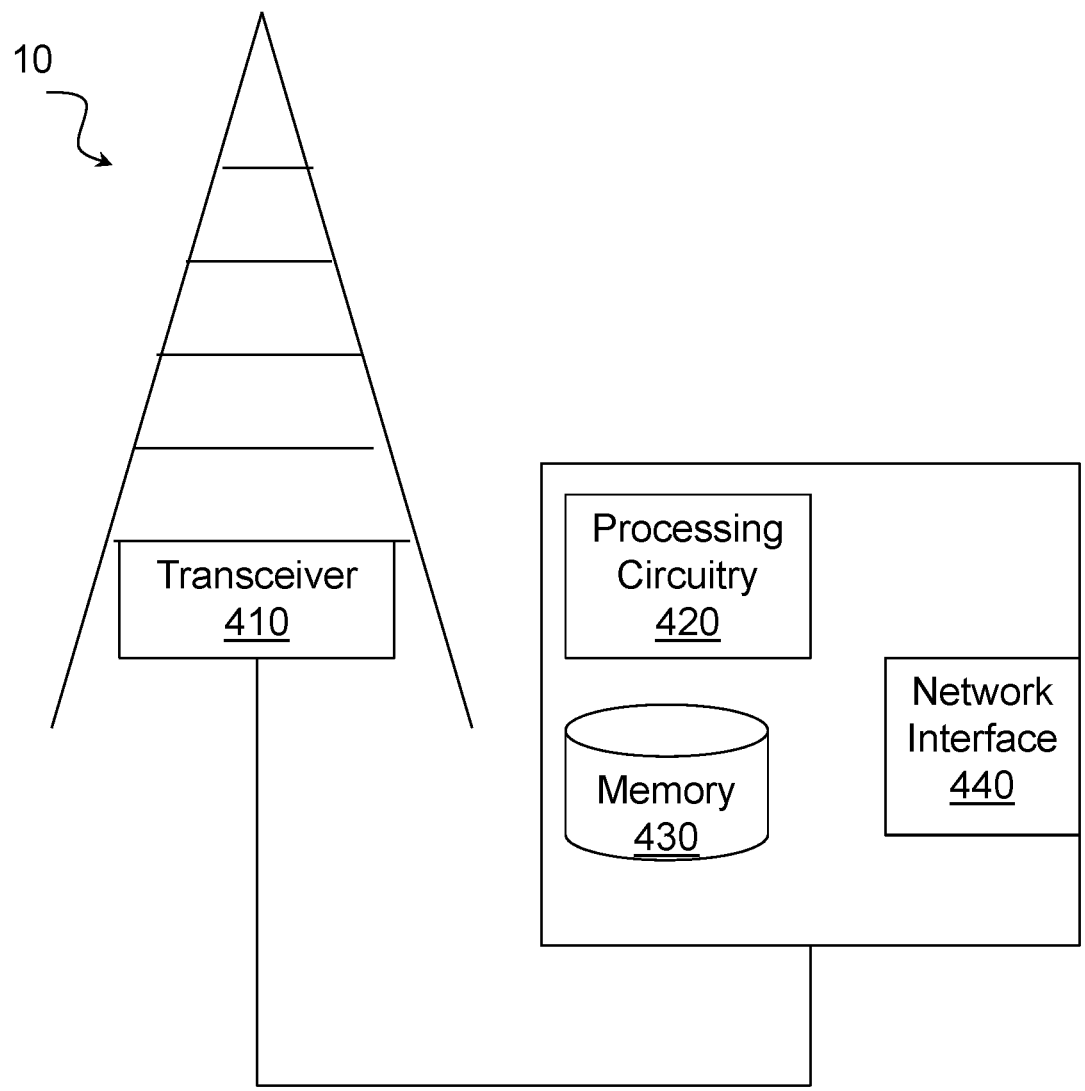
FIG. 4 illustrate an example network node for performing an addition or release of a secondary cell, in accordance with certain embodiments.

FIG. 4 illustrate an example network node 10 for controlling wireless device feedback on secondary cell activation and deactivation via the unlicensed spectrum, according to certain embodiments. As described above, network node 10 may be any type of radio network node or any network node that communicates with a wireless device 12 and/or with another network node 10. Examples of a network node 10 are provided above.

Network nodes 10 may be deployed throughout network 100 as a homogenous deployment, heterogeneous deployment, or mixed deployment. A homogeneous deployment may generally describe a deployment made up of the same (or similar) type of network nodes 10 and/or similar coverage and cell sizes and inter-site distances. A heterogeneous deployment may generally describe deployments using a variety of types of network nodes 10 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 10 may include one or more of transceiver 410, processing circuitry 420, memory 430, and network interface 440. In some embodiments, transceiver 410 facilitates transmitting wireless signals to and receiving wireless signals from wireless device 12 (e.g., via an antenna), processing circuitry 420 executes instructions to provide some or all of the functionality described above as being provided by a network node 10, memory 430 stores the instructions executed by processing circuitry 420, and network interface 440 communicates signals to backend network components, such as a gateway, switch, router, Internet, Public Switched Telephone Network (PSTN), core network nodes or radio network controllers, etc.

In certain embodiments, network node 10 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 420 may include any suitable combination of hardware and software implemented in one or more modules to execute instructions and manipulate data to perform some or all of the described functions of network node 10. In some embodiments, processing circuitry 420 may include, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processing circuitry 420 and may refer to any suitable device operable to receive input for network node 10, send output from network node 10, perform suitable processing of the input or output or both, communicate to other devices, or any combination of the preceding. Network interface 440 may include appropriate hardware (e.g., port, modem, network interface card, etc.) and software, including protocol conversion and data processing capabilities, to communicate through a network.

Other embodiments of network node 10 may include additional components beyond those shown in FIG. 4 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 5:
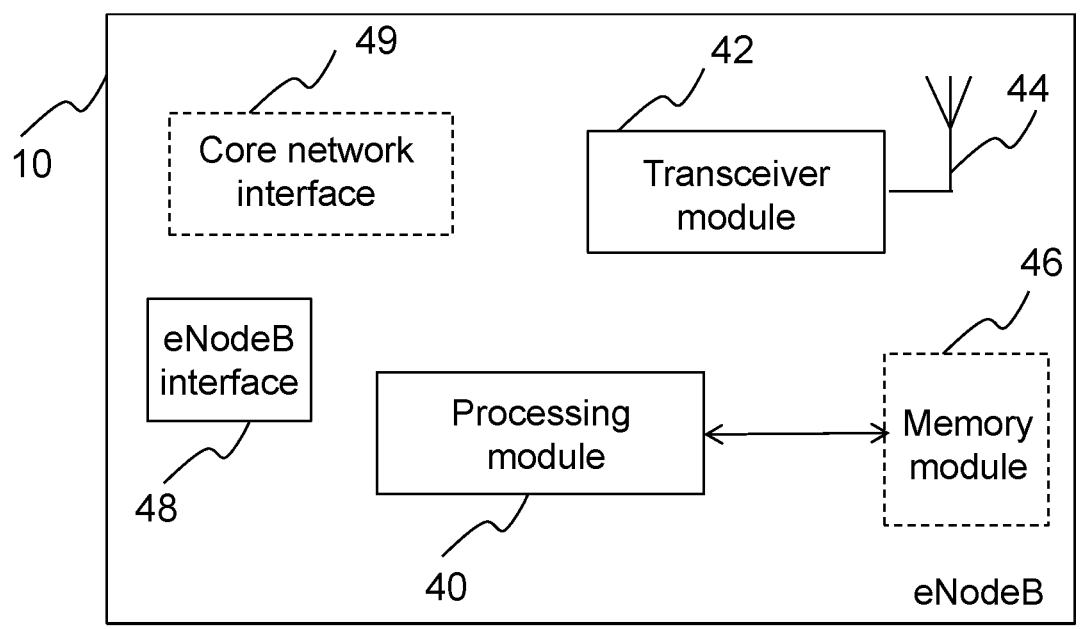
FIG. 5 illustrate another example network node for performing an addition or release of a secondary cell, in accordance with certain embodiments.

FIG. 5 illustrates a network node 10, which may also be referred to as a base station 10, a NodeB 10, or an eNB 10, that can be used in example embodiments described. It will be appreciated that although a macro eNB will not in practice be identical in size and structure to a micro eNB, for the purposes of illustration, the base stations 10 are assumed to include similar components. Thus, the base station 10 comprises a processing module 40 that controls the operation of the base station 10. The processing module 40 is connected to a transceiver module 42 with associated antenna(s) 44 which are used to transmit signals to, and receive signals from, UEs 12 in the network 2. The base station 10 also comprises a memory module 46 that is connected to the processing module 40 and that stores program and other information and data required for the operation of the base station 10. The base station 10 also includes components and/or circuitry 48 for allowing the base station 10 to exchange information with other base stations 10 (for example via an X2 interface) and components and/or circuitry 49 for allowing the base station 10 to exchange information with nodes in the core network 4 (for example via the S1 interface). It will be appreciated that base stations for use in other types of network (e.g. UTRAN or WCDMA RAN) will include similar components to those shown in FIG. 3 and appropriate interface circuitry 48, 49 for enabling communications with the other network nodes in those types of networks (e.g. other base stations, mobility management nodes and/or nodes in the core network).

In some embodiments, the generic terminology Primary Serving Cell (PCell), Primary Secondary Cell (PSCell), and Secondary (Serving) Cell (SCell) are used. These terms may refer to different types of serving cells which a certain wireless device 12 is configured to use. Other terms which may be used for these terms are Primary Component Carrier (PCC), Primary Secondary Component Carrier (PSCC), Secondary Component Carrier (SCC), respectively.

The embodiments are applicable to single carrier as well as to multicarrier or carrier aggregation (CA) operation of the wireless device 12 in which the wireless device 12 is able to receive and/or transmit data to more than one serving cells. CA may also be interchangeably called a "multi-carrier system", a "multi-cell operation", a "multi-carrier operation", "multi-carrier" transmission and/or reception. In CA, one of the component carriers (CCs) is the primary component carrier (PCC) or simply primary carrier or even anchor carrier. The remaining CCs are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

In Dual Connectivity (DC) operation, the wireless device 12 can be served by at least two network nodes 10 called master eNB (MeNB) and secondary eNB (SeNB). More generally, in multiple connectivity (aka multi-connectivity) operation, the wireless device 12 can be served by two or more nodes e.g. MeNB, SeNB1, SeNB2 and so on. The wireless device 12 is configured with PCC from both MeNB and SeNB. The PCell from MeNB and SeNB are called as PCell and PSCell, respectively. Typically, the PCell and PSCell operate the wireless device 12 independently. The wireless device 12 is also configured with one or more SCCs from each of MeNB and SeNB. The corresponding secondary serving cells served by MeNB and SeNB are called SCell. The wireless device 12 in DC typically has separate TX/RX for each of the connections with MeNB and SeNB. This allows the MeNB and SeNB to independently configure the wireless device 12 with one or more procedures e.g. radio link monitoring (RLM), DRX cycle, etc. on their PCell and PSCell, respectively. The methods and embodiments are applicable to CA, DC, and Multi-Connectivity (MC).

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term DRS or discover (or discovery) signal may comprise of any type of reference signal, which can be used by the UE for performing one or more measurements. Examples of DRS are cell-specific reference signal (CRS), channel state information-reference signal (CSI-RS), primary synchronization signal (PSS), secondary synchronization signal (SSS), MBSFN RS etc. One or more DRS may be transmitted in the same DRS time resource. Examples of DRS time resource are symbol, subframe, slot etc.

The term "measurement" herein refers to radio measurements. Some examples of the radio measurements are: received signal strength indication (RSSI) measurement, channel occupancy measurement, WiFi RSSI measurement, signal strength or signal power measurements (e.g., reference signal received power (RSRP) or channel state information-reference signal received power (CSI-RSRP)), signal quality measurements (e.g., reference signal received quality (RSRQ), signal to interference noise ratio (SINR), timing measurements (e.g., Receiver-Transmitter (Rx-Tx), reference signal time difference (RSTD), round trip time (RTT), time of arrival (TOA)), radio link monitoring measurements (RLM), CSI, precoding matrix indication (PMI), cell detection, cell identification, number of successful reports, number of acknowledgements (ACKs)/negative acknowledgements (NACKs), failure rate, error rate, etc. The measurements may be absolute or relative (e.g., absolute RSRP and relative RSRP). The measurements may be performed for one or more different purpose, e.g., radio resource management (RRM), SON, positioning, MDT, etc. The measurements may be, e.g., intra-frequency measurements, inter-frequency measurements, or CA measurements. The measurements may be performed in the licensed and/or unlicensed spectrum. The measurements or measurement reporting may be single measurements, periodic or aperiodic, event-triggered, logged measurements, etc.

The term LBT used herein may correspond to any type of Carrier Sense Multiple Access (CSMA) procedure or mechanism which is performed by the node on a carrier before deciding to transmit signals on that carrier. CSMA or LBT may also be interchangeably called clear channel assessment (CCA) or clear channel determination. The transmission of signals on carrier subjected to LBT is also called as contention-based transmission. On the other hand, the transmission of signals on carrier which is not subjected to LBT is also called as contention-free transmission.

The term time resource used herein may correspond to any type of physical resource or radio resource expressed in terms of length of time. Examples of time resources are: symbol, time slot, subframe, radio frame, transmission time interval (TTI), interleaving time etc.

Figure 6:
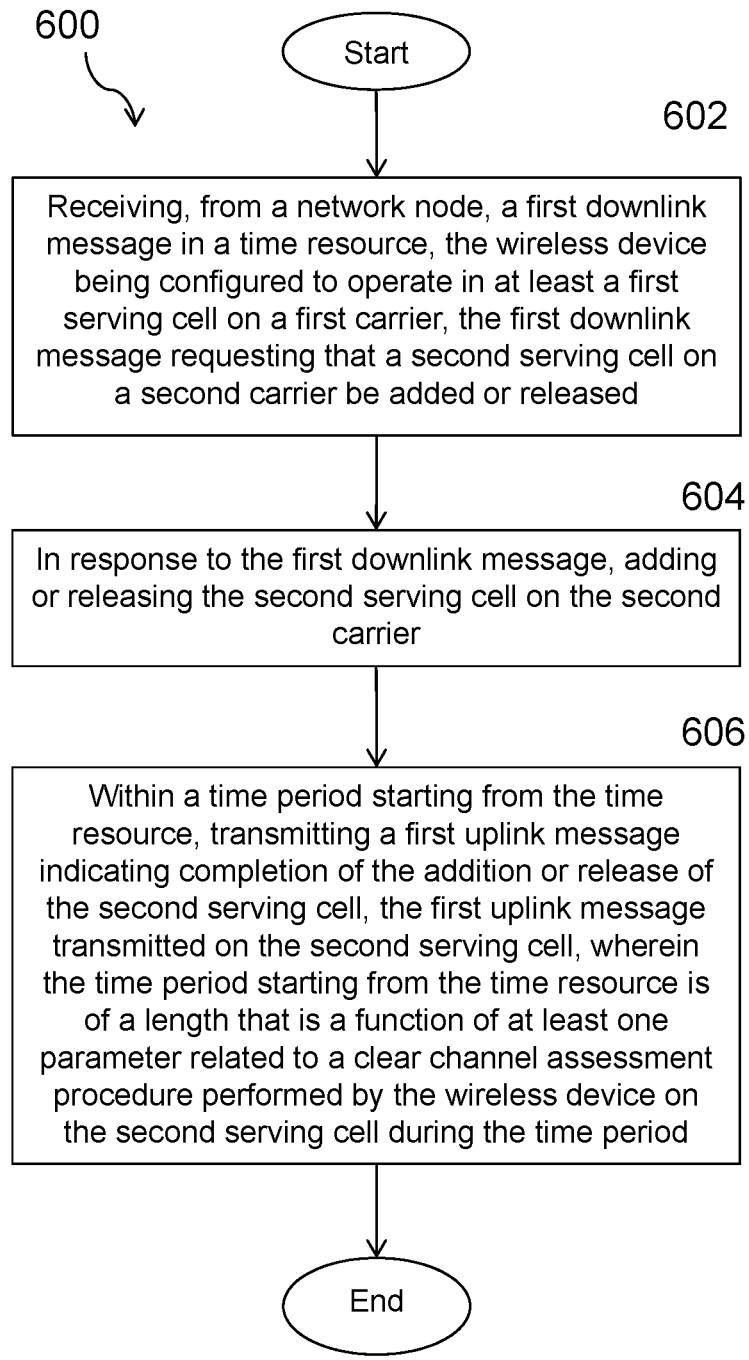
FIG. 6 illustrates an example method by a wireless device for performing an addition or release of a secondary cell, in accordance with certain embodiments.

FIG. 6 illustrates an exemplary method 600 by a wireless device 12 for performing an addition or release of a secondary cell, in accordance with certain embodiments. According to certain embodiments, the wireless device is a multi-carrier capable UE configured with at least a first serving cell (cell1) on a first carrier (f1). The method for performing an addition or release operation may begin at step 602 when a wireless device 12 configured to operate in at least a first serving cell on a first carrier receives, from a network node, a first downlink message in a time resource.

The first downlink message requests the wireless device 12 to add or release a second serving cell on a second carrier.

In an example embodiment, a wireless device 12 may be configured with at least a first cell (cell1) operating on a first carrier frequency (f1) and receive at least a first downlink message (DLM1) from a first network node (NW1) in a time resource (m) requesting the wireless device 12 to add or release a second serving cell (cell2) operating on a second carrier (f2). The DLM1 may be received by the wireless device on cell1.

According to certain embodiments, the frequency f2 may belong to an unlicensed band or spectrum but it may also operate on licensed band or spectrum. The frequency f1 may belong to licensed band or spectrum but may also operate on unlicensed band or spectrum. According to certain embodiments, f1 and f2 may or may not be the same, but at least one of them is unlicensed spectrum.

In a particular embodiment, wireless device 12 may further be requested to add or release a third serving cell (cell3) operating on a third carrier frequency (f3). Wireless device 12 may receive the request to add or release cell3 from NW1 or from a second network node (NW2). Wireless device 12 may receive the request to add or release cell2 and cell3 from NW1 via the same message, DLM1, or via a second downlink message (DM2). Wireless device 12 may also receive to add or release plurality of downlink messages from the same or different network nodes 10 via the same downlink message or different downlink message. The downlink messages to add or release plurality of serving cells may be received by wireless device 12 on cell1 or on different cells. Wireless device 12 may receive different DL messages to add or release serving cells in the same time resource (m) or in different time resources. In a particular embodiment, the wireless device 12 may receive DLM1 and DLM2 in time resource, m. In another particular embodiment, wireless device 12 may receive DLM1 and DLM2 in time resource, m and time resource, m1 respectively e.g. m1=m+x, where x is a positive integer expressed in multiple of time resources.

In a particular embodiment, wireless device 12 may be configured by the first network node 10 with one timing advance group (TAG), in which case cell1 and cell2 belong to the same TAG e.g. primary TAG (pTAG). In this case, wireless device 12 may use a first timing advance (TA1) for transmitting signals on cell1 and cell2. In another exemplary implementation, wireless device 12 may be configured by the first network node 10 with two or more timing advance groups, in which case cell1 and cell2 may belong to different TAGs. For example, cell1 may be associated with pTAG and cell2 may be associated with secondary TAG (sTAG). In this case, wireless device 12 may use first timing advance (TA1) for transmitting signals on cell1 and a second timing advance (TA2) for transmitting signals on cell2.

According to certain embodiments, downlink messages that request wireless device 12 to add or release one or more secondary cells may be sent by one or more of the following mechanisms or protocol: RRC, MAC and physical channels such as, for example, PDCCH and E-PDCCH. According to certain embodiments, example downlink messages to add or release one or more secondary cells may include activation commands, deactivation commands, configurations, reconfigurations, releases, additions of SCell, PSCell, or another cell.

At step 604, wireless device 12 adds or releases the second serving cell on the second carrier in response to the first downlink message. Continuing the example described above, wireless device 12 may add or release at least cell2 based on the received DLM1. Wireless device 12 may further add or release additional serving cells if the DLM1 or other downlink messages requested wireless device 12 to add a plurality of serving cells.

According to certain embodiments, wireless device 12 first determines based on the at least DLM1 whether wireless device 12 is required to add or release cell2. Wireless device 12 may also determine whether wireless device 12 is required to add one or more serving cells and/or release one or more serving cells. This may require wireless device 12 to process the DLM1 or any more DL messages related to the addition or release of one or more serving cells.

According to certain embodiments, wireless device 12 may perform the addition or release of cell2 within a time period (T1) starting from the time resource (m), which is a function of at least one parameter related to UL LBT procedure performed or executed on cell2 during T1. For example, in a particular embodiment, T1 can be expressed by the following general expression:

$$T1 = f1(Tb, K1, \alpha) \quad (1)$$

Where:
Tb is a basic time period for adding or releasing cell2. In a particular embodiment, the value of Tb may be the same or different for the addition and release of cell2. In a particular embodiment, the value of Tb may further depend on whether cell2 is known to wireless device 12 or unknown to wireless device 12. In a particular embodiment, cell2 may be known to wireless device 12 if wireless device 12 has identified cell2 or has sent a measurement report within the last certain time period. For example, cell2 may be known to wireless device 12 if wireless device 12 has sent a report within 5 seconds, in one example embodiment. Conversely, where wireless device has not sent a measurement report, cell2 may be unknown.

As an example, assume Tb is 24 ms for activation of cell2 if cell2 is known and Tb is 34 ms if cell2 is unknown to wireless device 12. In another example, Tb may be equal to 8 ms for deactivation of cell2.

The value of cell2 may further depend whether wireless device 12 receives DLM2 for adding or releasing one or more cells (e.g. cell3) during T1. This is because the addition or release of cell3 during T1 (e.g. 5 ms) of procedure on cell2 results in an interruption (e.g., 5 ms). For example, if wireless device 12 receives DLM2 for adding or releasing cell3 during T1 and then Tb can be 29 ms and 39 ms if the cell2 is known and unknown respectively to wireless device 12.

K1 is the parameter related to UL LBT procedure applied by wireless device 12 on cell2 during T1 while the UE is adding or releasing cell2. Examples of K1 may:
be the number of times the UL LBT fails on cell2 during T1;
be the number of times wireless device 12 is unable to transmit a first uplink message (ULM1) on cell2 due to UL LBT failure(s) on cell2 during T1;
characterize the probability of LBT;
characterize the periodicity of LBT;
characterize channel holding time after the LBT success or the maximum channel holding time;
characterize a parameter related the fairness of channel access, such as, for example, when wireless device 12 cannot occupy the channel for the time longer than 1:10 in relation to a reference time or for longer than 10%.

α is a wireless device's implementation margin (though, in a particular embodiment, as special case, α can be neglected and be set to 0).

In a particular embodiment, for example, the general expression in (1) may be expressed by the following more specific expression:

$$T1 = Tb + K1 Tb + \alpha$$

According to certain other embodiments, T1 may be expressed by the following general expression:

$$T1 = f2(Tb, K1, Tr, \alpha) \quad (2)$$

where:
Tr is a periodicity of the occurrence of time resources in which wireless device 12 may send ULM2 on cell2 indicating the completion of the addition or release of cell2. For example, according to a particular embodiment, Tr may be the period of the occurrence time resources of an uplink channel on cell2 to send ULM1 indicating the completion of the addition or release of cell2. Examples of the uplink channels may include PUCCH, random access, data channels such as PUSCH. For example, in a particular embodiment, Tr may be equal to 20 ms.

According to a particular embodiment, wireless device 12 may perform the addition or release of cell2 within a time period (T1) starting from the time resource (m), which may be a function of at least one parameter related to UL LBT procedure performed or executed on cell2 by wireless device 12 during T1 and also of at least one parameter related to DL LBT procedure performed or executed on cell2 by the network node during T1. Examples are provided below.

In a particular embodiment, for example, the general expression in (2) can be expressed by the following more specific expression:

$$T1 = Tb + K1 * Tr + \alpha$$

According certain other embodiments, T1 may be a function of both UL LBT and DL LBT on cell2 and can be expressed by the following general expression:

$$T1 = f3(Tb, K1, K2, \alpha) \quad (3)$$

where:
K2 is the parameter related to DL LBT procedure applied by a network node 10 operating cell2 during T1 such as, for example, while wireless device 12 is adding or releasing cell2. According to certain embodiments, examples of K2 may:
be the number of times the DL LBT fails on cell2 during T1;
be the number of times wireless device 12 is unable to receive signals on cell2 used for adding or releasing cell2 during T1 such as, for example, due to DL LBT failures on cell2 during T1.
characterize the probability of LBT;
characterize the periodicity of LBT;
characterize channel holding time after the LBT success or the maximum channel holding time;
characterize a parameter related the fairness of channel access, e.g., UE cannot occupy the channel for the time longer than 1:10 in relation to a reference time or for longer than 10%.

In a particular embodiment, for example, the general expression in (3) may be expressed by the following more specific expression:

$$T1 = Tb + (K + k2) * Tb + \alpha$$

According to yet certain other embodiments, T1 may be is a function of both UL LBT and DL LBT procedures on cell2 and can be expressed by the following general expression:

$$T1 = f4(Tb, K1, Tr, K2, Tu, \alpha) \qquad (4)$$

where:

Tu is a periodicity of the occurrence of time resources in downlink in which wireless device 12 uses one or more signals for adding or release cell2. Examples of such DL signals may include discovery signals such as PSS, SSS, CRS, etc. In a particular embodiment, for example, Tu may be any of 40 ms, 80 ms and 160 ms.

In a particular embodiment, for example, the general expression in (4) may be expressed by the following more specific expression:

$$T1 = Tb + K1*Tr + k2*Tu + \alpha$$

In another aspect of this embodiment the T1 may further depend on whether wireless device 12 is configured to operate cell1 and cell2 in the same TAG (e.g. pTAG) or in different TAGs (e.g. cell1 in TAG1 such as pTAG and cell2 in TAG2 such as sTAG). If wireless device 12 is configured to operate cell2 and cell1 in different TAGs then wireless device 12 may require valid TA2 for transmitting ULM1 on cell2 within T1. A timing advance (TA) may be considered valid until the expiry of the time alignment timer (TAT). The TA may be considered to be invalid upon the expiration of TAT. According to certain embodiments, wireless device 12 may start TAT upon receiving a TA command from the network node. For example, wireless device 12 may start TAT upon receiving a TA command from cell1 on control channel such as PDCCH.

According to certain embodiments, if wireless device 12 has valid TA2 for TAG2 containing cell2, then wireless device 12 may send ULM1 on cell2 within T1 in accordance any of the expressions (1)-(4) stated above. Conversely, if wireless device 12 does not have a valid TA2 for TAG2 containing cell2, then wireless device 12 may first acquire a TA2 for cell2 before sending ULM1 on cell2. In this case, in order to acquire TA2, wireless device 12 may send a second uplink message (ULM2) on cell2 before sending ULM1 on cell2.

In a particular embodiment, ULM2 may be a random access channel on cell2. For example, ULM2 may be a non-contention based RA transmission. In response, NW1 or another network node 10 may transmit a third downlink message (DLM3) containing TA2 value to wireless device 12. According to certain embodiments, DLM3 may be transmitted on a control channel such as, for example, PDCCH or E-PDCCH. In other embodiments, DLM3 may be transmitted on a data channel such as, for example, PDSCH. According to certain embodiments when wireless device 12 needs valid TA2, wireless device 12 may send ULM1 on cell2 within T1, which is a function of at least UL LBT procedure on cell2 and which can be expressed by the following general expression:

$$T1 = f5(Tb, Ta, K1, \alpha) \qquad (5)$$

where:

Ta is the total time required by wireless device 12 to acquire valid TA2 from the network node for TAG containing cell2.

In a particular embodiment, for example, the general expression in (5) may be expressed by the following more specific expression:

$$T1 = Tb + Ta + K1*Ta + \alpha$$

According to yet certain other embodiments, T1 may be a function of both UL LBT and DL LBT procedures on cell2, and wireless device 12 may needs to acquire valid TA2 for cell. As such, T1 may be expressed by the following general expression:

$$T1 = f6(Tb, Ta, K1, K2, \alpha) \qquad (6)$$

In a particular embodiment, for example, the general expression in (6) may be expressed by the following more specific expression:

$$T1 = Tb + K1*Tr + K2*Tu + Ta + \alpha$$

According to yet another particular embodiment, T1 may be a function of both UL LBT and DL LBT procedures on cell2, and wireless device 12 may need to acquire valid TA2 for cell. As such, T1 may be expressed by the following general expression:

$$T1 = f7(Tb, Ta, K1, Tr, K2, Tu) \qquad (7)$$

According to certain embodiments, the parameter, Ta, as included above in some of the example expressions may further be expressed by the following general expression where at least UL LBT is applied on cell2:

$$Ta = f(Ta1, Ta2, Ta3, K1', \beta) \qquad (8)$$

where:
 Ta1 is the delay uncertainty in acquiring the first available occasion for sending ULM2 (e.g. PRACH occasion) in cell2 (e.g. in PUCCH SCell). As an example, Ta1 may be up to 25 subframes, in particular embodiments, and the actual value of Ta1 may depend upon the ULM2 configuration used in cell2. For example, Ta1 may depend upon the PRACH configuration used in the PUCCH SCell, in a particular embodiment.
 Ta2 is the delay for obtaining a valid TA command for the TAG (e.g. sTAG) to which cell2 is configured. In a particular embodiment, for example, Ta2 may be up to 13 subframes.
 Ta3 is the delay for applying the received TA for transmission of ULM1 on cell2. As an example, Ta3 may be 6 subframes, in a particular embodiment.
 K1' is the number of times wireless device 12 is unable to transmit ULM2 on cell2 due to UL LBT failure on cell2.
 $\beta$ is an implementation margin of wireless device 12. As special case $\beta = 0$.

According to certain other embodiments, Ta, may be expressed by the following general expression where at least UL LBT is applied on cell2:

$$Ta = f8(Ta1, Ta2, Ta3, K1', Tp, \beta) \qquad (9)$$

where:
 Tp is the periodicity of occasions for transmitting ULM2. For example, Tp may be the PRACH occasion periodicity such as 20 ms, in a particular embodiment.

According to certain embodiments, in the above general expressions in (8) and (9), the value of T1 is also applicable for the case when the UL LBT as well as the DL LBT are applied on cell2 and wireless device 12 receives DLM3 on cell1 or on any serving cell on which no DL LBT is applied. For example, wireless device 12 may receive TA2 for cell2 on cell 1, in a particular embodiment.

According to certain embodiments, Ta may further be expressed by the following general expression where UL LBT and DL LBT are applied on cell2 and wireless device 12 receives DLM3, which may include TA2 for cell2 in a particular embodiment, also on cell2:

$$Ta = f9(Ta1, Ta2, Ta3, K1', K2', \beta) \qquad (10)$$

where:
K2' is the number of times wireless device 12 is unable to receive DLM3 on cell2 due to DL LBT failure on cell2.

According to certain other embodiments, Ta may further be expressed by the following general expression where UL LBT as well as DL LBT are applied on cell2 and wireless device 12 receives DLM3, which may include TA2 for cell2 in a particular embodiment, also on cell2:

$$Ta=f10(Ta1,Ta2,Ta3,K1',K2',Tp,Tt,\beta) \quad (11)$$

where:
Tt is the periodicity of occasions or time resources in which cell2 can send TA command for cell2 on cell2 to wireless device 12.

According to certain embodiments, the general expression in (8) may be expressed by the following specific expression:

$$Ta=Ta1+Ta2+Ta3+K1'*Ta1+\beta \quad (12)$$

According to certain embodiments, the general expression in (9) may be expressed by the following specific expression:

$$Ta=Ta1+Ta2+Ta3+K1'*Tp+\beta \quad (13)$$

According to certain embodiments, the general expression in (10) may be expressed by the following specific expression:

$$Ta=Ta1+Ta2+Ta3+K1'*Ta1+K2'*Ta2+\beta \quad (14)$$

According to certain embodiments, the general expression in (11) may be expressed by the following specific expression:

$$Ta=Ta1+Ta2+Ta3+K1'*Tp+K2'*Tt+\beta \quad (15)$$

According to certain embodiments, the parameter, Tb, in the above expressions may be expressed by the following general expression:

$$Tb=f11(Td,Tdp,K2'',P,\mu,\gamma) \quad (16)$$

where:
Tdp is the duration of discovery signal occasion used for addition or release of cell2. For example, Tdp may be a DMTC duration.
Tdp is the periodicity of the occurrence of the discovery signals used for addition or release of cell2. For example, Tdp may be a DMTC periodicity.
K2'' is the number of times the discovery signal occasion is not available at wireless device 12 during the cell2 addition or release procedure such as during SCell activation time, for example.
P is the number is the number of times the serving cells other than cell2 are requested to be added or released during T1.
μ is the interruption duration for adding or releasing one serving cell. For example, in a particular embodiment, μ may be equal to 5 ms.
γ is the implementation margin of wireless device 12. In a particular embodiment, for example, γ may be equal to zero.

According to certain embodiments, the general expression in (16) may be expressed by the following specific expression assuming that during T1, wireless device 12 is requested to add or release only cell2:

$$Tb=\gamma+Td+K1''*Tdp \quad (17)$$

According to certain embodiments, the general expression in (16) may also be expressed by the following specific expression assuming that during T1 wireless 12 is requested to add or release only cell2:

$$Tb=\gamma+Td+(K1''+\delta)*Tdp \quad (18)$$

where δ can be an integer e.g. δ=2.

According to certain embodiments, the general expression in (16) can be expressed by the following specific expression assuming that during T1 wireless device 12 is requested to add or release one or more serving cells while wireless device 12 is also adding or release cell2:

$$Tb = \gamma + Td + K1'' * Tdp + \mu \times \sum_{i=1}^{N-1} P_i \quad (19)$$

where N is the maximum number of serving cells supported by wireless device 12.

At step 606, wireless device 12 transmits a first uplink message indicating completion of the addition or release of the second serving cell within a time period starting from the time resource. The time period starting from the time resource may be of a length that is a function of at least one parameter related to a CCA procedure performed by wireless device 12 on the second serving cell during the time period.

According to certain embodiments, for example, wireless device 12 transmits the first uplink message (ULM1) on cell2 within T1. If the cell is added or release successfully, the message indicates that wireless device 12 has successfully completed the procedure to add or release cell2. In various particular embodiments, the message may comprise of one or more of the following:
a measurement report of measurement done on cell2 such as, for example, RSRP, RSRQ, RS-SINR, and/or CSI measurement results for cell2 such as CQI with non-zero CQI index;
ACK or NACK message;
an indication that cell2 has been added or released or an indication that cell2 has not been added or released (e.g., 0 may be used to indicate a success and 1 may be used to indicate a failure of the add or release of cell2, according to particular embodiments).

According to certain embodiments, wireless device 12 message may prepare itself for receiving configuration for operation on cell2 upon sending a message. For example, wireless device 12 may prepare itself to receive a scheduling grant for transmitting signals to cell2 and/or receiving signals from cell2, in a particular embodiment.

According to certain other embodiments, if wireless device 12 is unable to add or release cell2 within the duration T1 according to any of the expressions mentioned above, wireless device 12 may apply one or more of the following actions:
abort the procedure of adding or releasing cell2;
abort the procedure of adding or releasing at least one serving cell other than cell2 where wireless device 12 has received request to add or release one or more other serving cells during T1;
transmit ULM1 via cell1 instead of sending it on cell2;
transmit ULM1 via a primary serving cell such as, for example, PCell or PSCell instead of sending it on cell2;
transmit ULM1 via any serving cell other than cell2;
transmit ULM1 via any serving cell where no UL LBT and/or no DL LBT is performed such as where the serving cell belong to licensed carrier;

perform any of the above actions when one or more of the following conditions are met:
- T1 exceeds a threshold;
- any one or more of the parameters related to UL LBT and/or DL LBT used in the above mentioned expressions exceed their respective thresholds, such as for example where any of K1, K2, K1', K2' and K2" exceed their respective thresholds.

Figure 7:
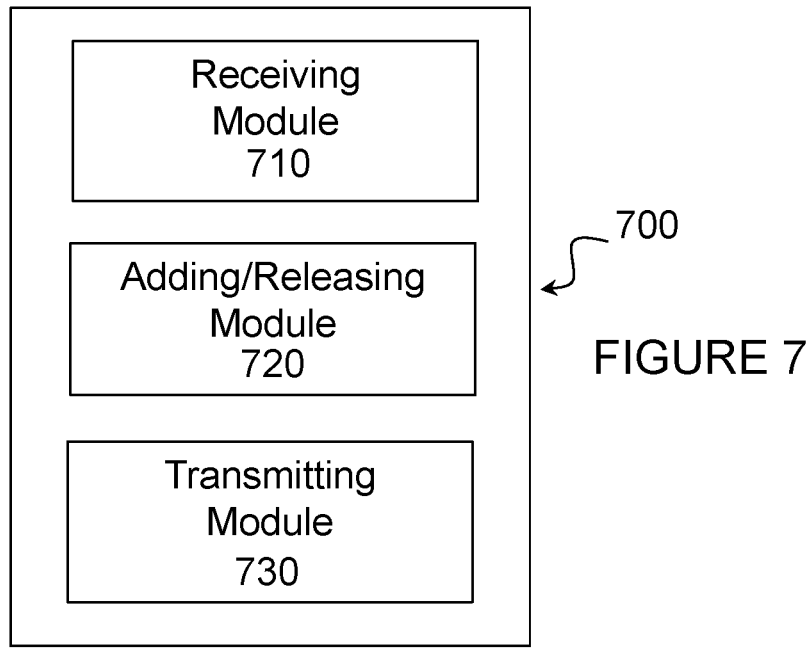
FIG. 7 illustrates an example virtual computing device for performing an addition or release of a secondary cell, in accordance with certain embodiments.

In certain embodiments, the method for performing an addition or release of a secondary cell as described above may be performed by a virtual computing device. FIG. 7 illustrates an example virtual computing device 700 for performing an addition or release of a secondary cell, according to certain embodiments. In certain embodiments, virtual computing device 700 may include modules for performing steps similar to those described above with regard to the method illustrated and described in FIG. 6. For example, virtual computing device 700 may include a receiving module 710, an adding/releasing module 720, a transmitting module 730, and any other suitable modules for controlling wireless device feedback on secondary cell activation and deactivation via the unlicensed spectrum. In some embodiments, one or more of the modules may be implemented using one or more of processing circuitry of FIG. 2 or processing module 30 of FIG. 3. In certain embodiments, the functions of two or more of the various modules may be combined into a single module.

The receiving module 710 may perform the receiving functions of virtual computing device 700. For example, in a particular embodiment, receiving module 710 may receive, from a network node, a first downlink message in a time resource. According to certain embodiments, a wireless device associated with receiving module 710 may be configured to operate in at least a first serving cell on a first carrier, the first downlink message requesting that a second serving cell on a second carrier be added or released.

The adding/releasing module 720 may perform the adding and/or releasing functions of virtual computing device 700. For example, in a particular embodiment, adding/releasing module 720 may add or release the second serving cell on the second carrier in response to the first downlink message.

The transmitting module 730 may perform the transmitting functions of virtual computing device 700. For example, in a particular embodiment, transmitting module 730 may transmit a first uplink message indicating completion of the addition or release of the second serving cell. According to certain embodiments, the first uplink message may be transmitted on the second serving cell and within a time period starting from the time resource. The time period starting from the time resource may be of a length that is a function of at least one parameter related to a CCA procedure performed by the wireless device on the second serving cell during the time period.

Other embodiments of virtual computing device 700 may include additional components beyond those shown in FIG. 7 that may be responsible for providing certain aspects of the wireless device's functionality, including any of the functionality described above and/or any additional functionality (including any functionality necessary to support the solutions described above). The various different types of wireless devices 12 may include components having the same physical hardware but configured (e.g., via programming) to support different radio access technologies, or may represent partly or entirely different physical components.

Figure 8:
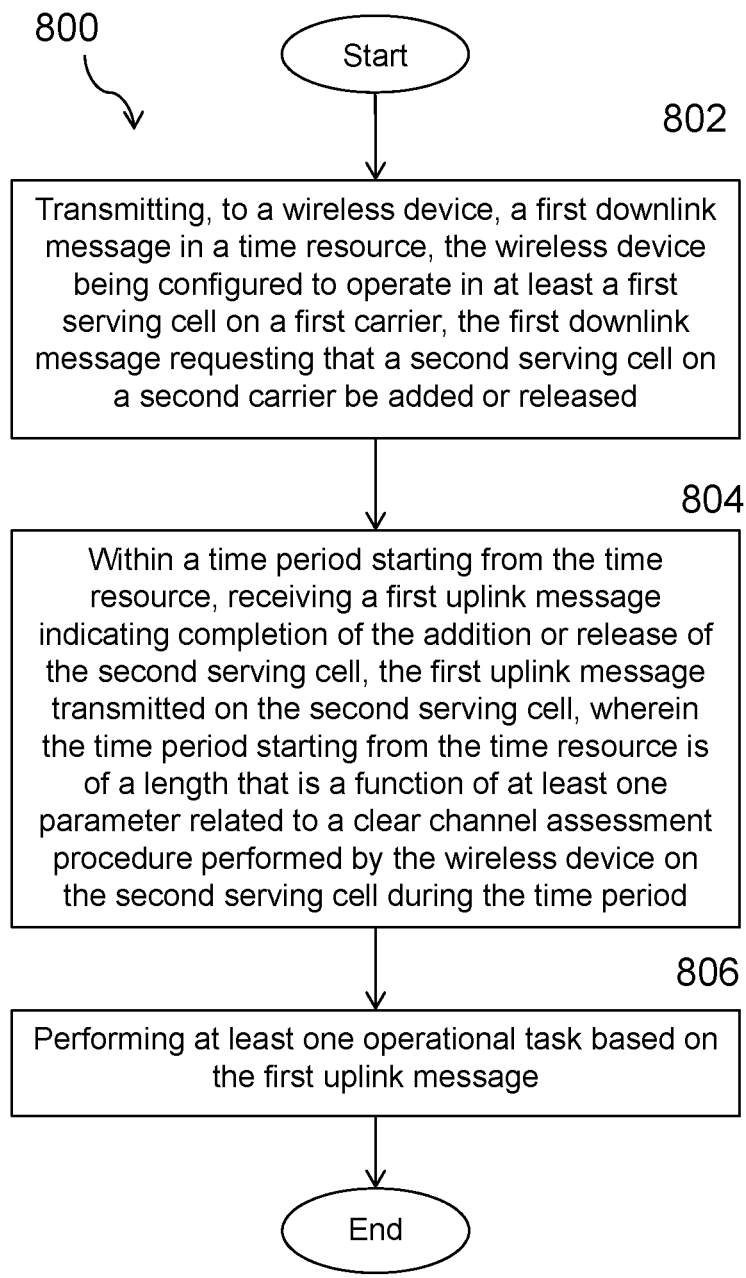
FIG. 8 illustrates an exemplary method by a network node for performing an addition or release of a secondary cell, in accordance with certain embodiments.

FIG. 8 illustrates an example method 800 by a network node 10 for performing an addition or release of a secondary cell, according to certain embodiments. The method begins at step 802 when network node 10 transmits, to a wireless device 12, a first downlink message in a time resource. According to certain embodiments, wireless device 12 may be configured to operate in at least a first serving cell on a first carrier. The downlink message may request wireless device 12 to add or release a second serving cell on a second carrier.

According to certain embodiments, for example, a first network node 10*a* may determine that a wireless device 12 capable of multi-carrier operation needs to add or release a second serving cell (cell2) on a second frequency (f2), which is subjected to at least UL LBT procedure by the wireless device 12. Network node 10*a* may determine this based on, for example, the amount of data in a UE buffer. In a particular embodiment, for example, wireless device 12 may need to add cell2 when the amount of traffic in the buffer is above a threshold.

In response to determining the need to add or release cell2, the first network node 10*a* transmits a first DL message (DLM1) to wireless device 12 in time resource (n) for requesting wireless device 12 to add or release cell2. First network node 10*a* may further request wireless device 12 to add one or more serving cells by sending the request in DLM1 or in another message or in different messages.

According to a particular embodiment, an example of DLM1 may include a MAC command, a PDCCH order, or an RRC message. The command may be, for example, to activate or deactivate SCell on f2.

At step 804 and within a time period starting from the time resource, network node 10 receives a first uplink message indicating completion of the addition or release of the second serving cell. According to certain embodiments, the first uplink message may be transmitted on the second serving cell and the time period starting from the time resource may be of a length that is a function of at least one parameter related to a CCA procedure performed by wireless device 12 on the second serving cell during the time period.

For example, in a particular embodiment, first network node 10*a* may receive a first UL message (ULM1) from wireless device 12 within a first time period (T1) starting from the time resource (n). The ULM1 may indicate the outcome of the procedure to add or release applied by wireless device 12 on cell2 as requested in the received DLM1.

Additionally, according to a particular embodiment, first network node 10*a* may further send to wireless device 12 a third DL message (DLM3) containing a timing advance command for TAG in which cell2 is configured. First network node 10*a* may send DLM3 autonomously or in response to receiving a request such as, for example, a random access request on cell2, from wireless device 12.

At step 806, network node 10 performs at least one operational task based on the first uplink message. According to certain embodiments, for example, first network node 10*a* may use the received ULM1 for one or more operational tasks that may include one or more of:
- scheduling wireless device 12 on uplink and/or in downlink;
- sending scheduling grants to wireless device 12 for enabling wireless device 12 to perform uplink and/or downlink transmission,
- deciding whether to add or release another serving cell for wireless device 12 such as, for example, depending on the duration of T1;
- transmitting information about the received ULM1 to another network node 10;

controlling UE CA configuration, which may comprise also sending a new CA configuration to wireless device 12;

sending the new UE CA configuration to another node such as, for example, another eNodeB or positioning node;

controlling the UE transmit power, which may also comprise also sending a new power control configuration to wireless device 12;

controlling UL timing in wireless device 12 by, for example, configuring or reconfiguring TAGs and/or DL reference for the UL timing;

changing the serving cell by way of, for example, a PCell change or SCell change;

configuring or reconfiguring measurement by the wireless device 12, which may also comprise sending a new measurement configuration to wireless device 12;

configuring or reconfiguring a positioning-related configuration of wireless device, which may also comprise sending a new positioning-related configuration to wireless device 12 (e.g., positioning measurement configuration, assistance data.)

Figure 9:
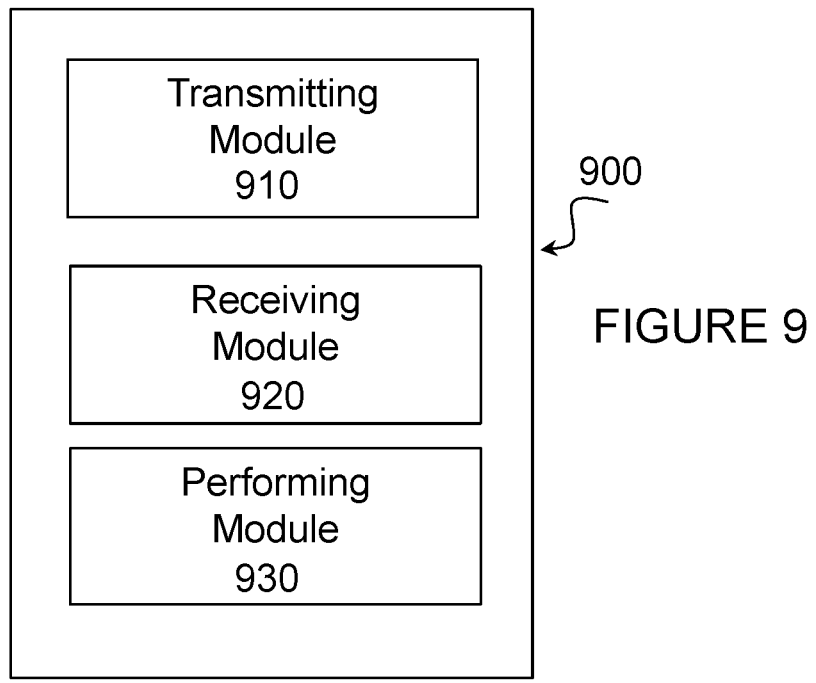
FIG. 9 illustrates another exemplary virtual computing device for performing an addition or release of a secondary cell, in accordance with certain embodiments.

In certain embodiments, the method for performing an addition or release of a secondary cell as described above may be performed by a virtual computing device. FIG. 9 illustrates an example virtual computing device 900 for performing an addition or release of a secondary cell, according to certain embodiments. In certain embodiments, virtual computing device 900 may include modules for performing steps similar to those described above with regard to the method illustrated and described in FIG. 8. For example, virtual computing device 900 may include at least one transmitting module 910, a receiving module 920, a performing module 930, and any other suitable modules for controlling wireless device feedback on secondary cell activation and deactivation via the unlicensed spectrum. In some embodiments, one or more of the modules may be implemented using processing circuitry 420 of FIG. 4 and/or processing module 40 of FIG. 5. In certain embodiments, the functions of two or more of the various modules may be combined into a single module.

The transmitting module 910 may perform the transmitting functions of virtual computing device 900. For example, in a particular embodiment, transmitting module 910 may transmit, to a wireless device 12, a first downlink message in a time resource. According to certain embodiments, wireless device 12 may be configured to operate in at least a first serving cell on a first carrier. The downlink message may request wireless device 12 to add or release a second serving cell on a second carrier.

The receiving module 920 may perform the receiving functions of virtual computing device 900. For example, in a particular embodiment, receiving module 920 may, within a time period starting from the time resource, receive a first uplink message indicating completion of the addition or release of the second serving cell. According to certain embodiments, the first uplink message may be transmitted on the second serving cell and the time period starting from the time resource may be of a length that is a function of at least one parameter related to a CCA procedure performed by wireless device 12 on the second serving cell during the time period.

The performing module 930 may perform the performing functions of virtual computing device 900. For example, in a particular embodiment, performing module 930 may perform at least one operational task based on the first uplink message.

Other embodiments of virtual computing device 900 may include additional components beyond those shown in FIG. 9 that may be responsible for providing certain aspects of the network node's 10 functionality, including any of the functionality described above and/or any additional functionality (including any functionality necessary to support the solutions described above). The various different types of wireless devices 10 may include components having the same physical hardware but configured (e.g., via programming) to support different radio access technologies, or may represent partly or entirely different physical components.

Figure 10:
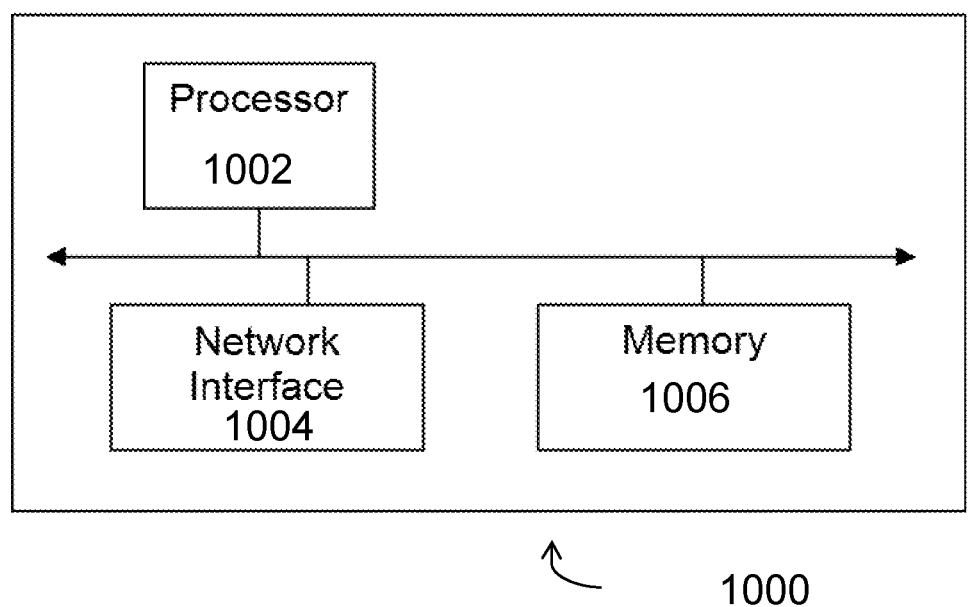
FIG. 10 illustrates an exemplary radio network controller or core network node, in accordance with certain embodiments.

FIG. 10 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1000 include processing circuitry 1020, memory 1030, and network interface 1040. In some embodiments, processing circuitry 1020 executes instructions to provide some or all of the functionality described above as being provided by the network node, memory 1030 stores the instructions executed by processing circuitry 1020, and network interface 1040 communicates signals to any suitable node, such as a gateway, switch, router, Internet, Public Switched Telephone Network (PSTN), network nodes 10, radio network controllers or core network nodes 1000, etc.

Processing circuitry 1020 may include any suitable combination of hardware and software implemented in one or more modules to execute instructions and manipulate data to perform some or all of the described functions of the radio network controller or core network node 1000. In some embodiments, processing circuitry 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processing circuitry 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

According to certain embodiments, a method by a wireless device for performing addition or release of a serving cell includes receiving a first downlink message in a time resource. The wireless device is configured to operate in at least a first serving cell on a first carrier, and the first downlink message requests that a second serving cell on a second carrier be added or released. In response to the first downlink message, the second serving cell on the second carrier is added or released. Within a time period starting from the time resource, wireless device transmits, on the second serving cell, a first uplink message indicating completion of the addition or release of the second serving cell. The time period starting from the time resource is of a length that is a function of at least one parameter related to a clear channel assessment (CCA) procedure.

According to certain embodiments, a wireless device is provided for performing addition or release of a serving cell. The wireless device includes processing circuitry configured to receive, from a network node, a first downlink message in a time resource. The wireless device is configured to operate in at least a first serving cell on a first carrier. The first downlink message requests that a second serving cell on a second carrier be added or released. In response to the first downlink message, the wireless device adds or releases the second serving cell on the second carrier. Within a time period starting from the time resource, the wireless device transmits a first uplink message indicating completion of the addition or release of the second serving cell. The first uplink message is transmitted on the second serving cell. The time period starting from the time resource is of a length that is a function of at least one parameter related to a clear channel assessment (CCA) procedure performed by the wireless device on the second serving cell during the time period.

According to certain embodiments, a method by a network node is provided for performing addition or release of a serving cell. The method includes transmitting, to a wireless device configured to operate in at least a first serving cell on a first carrier, a first downlink message in a time resource. The first downlink message requests that the wireless device add or release a second serving cell on a second carrier. Within a time period starting from the time resource, the network node receives, from the wireless device and on the second serving cell, a first uplink message indicating completion of the addition or release of the second serving cell. At least one operational task is performed based on the first uplink message. The time period starting from the time resource is of a length that is a function of at least one parameter related to a clear channel assessment (CCA) procedure performed by the wireless device on the second serving cell during the time period.

According to certain embodiments, a network node is provided for performing addition or release of a serving cell. The network node includes processing circuitry configured to transmit, to a wireless device configured to operate in at least a first serving cell on a first carrier, a first downlink message in a time resource. The first downlink message requests that the wireless device add or release a second serving cell on a second carrier. Within a time period starting from the time resource, a first uplink message indicating completion of the addition or release of the second serving cell is received from the wireless device on the second serving cell. The time period starting from the time resource is of a length that is a function of at least one parameter related to a clear channel assessment (CCA) procedure performed by the wireless device on the second serving cell during the time period. The network node performs at least one operational task is based on the first uplink message.

According to certain other embodiments, a method in a multicarrier capable wireless device configured with at least a first serving cell (cell1) on a first carrier (f1) is provided for performing an addition or release operation. The method may include receiving from a first network node in a time resource (m) a first downlink message (DLM1) for adding or releasing a second serving cell (cell2) on a second carrier (f2). The method may further include adding or releasing cell2 and transmitting a first uplink message (ULM1) on cell2 within a time period (T1) starting from the time resource associated with m indicating completion the addition or release cell2. T1 may be a function of at least one parameter related to at least an uplink LBT procedure performed by the UE on cell2 during T1. According to certain embodiments, the phrase 'associated with m' may include, for example, m+k (k=0, 1, . . . ).

According to certain embodiments, a method in a first network node serving a multicarrier capable wireless device configured with at least a first serving cell (cell1) on a first carrier (f1) is provided for enabling the wireless device to perform an addition or release operation. The method may include transmitting a downlink message (DLM1) to the wireless device in a time resource (m) for requesting the wireless device to add or release a second serving cell (cell2) on a second carrier (f2). The method may further include receiving a first uplink message (ULM1) from the wireless device on cell2 within a time period (T1) starting from the time resource associated with m. According to certain embodiments, T1 may be a function of at least one parameter related to at least an uplink LBT procedure performed by the UE on cell2 during T1. The received ULM1 may be used for one or more radio operational tasks such as, for example, scheduling the wireless device on cell2. According to certain embodiments, the phrase 'associated with m' may comprise e.g. m+k (k=0, 1, . . . ).

Certain embodiments of the present disclosure may provide one or more technical advantages. For example, according to certain embodiments, a wireless device performing carrier aggregation (CA) or direct connectivity (DC) operations may be able to activate or deactivate a SCell within a specified time even when the wireless device has to apply listen-before-talk (LBT) in the uplink (UL) of the SCell. Another technical advantage may include enabling a wireless device performing CA or DC operations to transmit an indication such as, for example, valid CSI, for the activated or deactivated on a cell where no UL LBT is applied if the wireless device is unable to send the indication within a specified time period. Specifically, certain embodiments may allow the wireless device to send the CSI on a cell associated with the licensed carrier. This may ensure that the network node becomes aware of the activation or deactivation status of the SCell as early as possible. Still another technical advantage may be the ability, in DC, to add or release a primary SCell (PSCell) within a specified time period even if the wireless device is required to perform UL LBT on the PSCell.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, while processes in the figures and description may show a particular order of operations performed by certain embodiments of the invention, it should be understood that such order is exemplary. Alternative embodiments may perform the operations in a different order, combine certain operations, and/or overlap certain operations.

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. Other changes, substitutions, and alterations are possible without departing from the spirit and scope of this disclosure, as defined by the following claims.

Abbreviations used in the preceding description include:
eNB evolved NodeB, base station
UE User Equipment

The invention claimed is:

1. A method by wireless device for performing addition or release of a serving cell, the method comprising:
   receiving, from a network node, a first downlink message in a time resource, the wireless device being configured to operate in at least a first serving cell on a first carrier, the first downlink message requesting that a second serving cell on a second carrier be added or released;
   in response to the first downlink message, adding or releasing the second serving cell on the second carrier; and
   within a time period starting from the time resource, transmitting a first uplink message indicating completion of the addition or release of the second serving cell, the first uplink message transmitted on the second serving cell,
   wherein the time period starting from the time resource is of a length that is a function of at least one parameter related to a clear channel assessment (CCA) procedure performed by the wireless device on the second serving cell during the time period.

2. The method of claim 1, wherein at least one parameter related to the CCA procedure is selected from the group consisting of:
   at first parameter related to an uplink LBT procedure;
   a first parameter related to a downlink LBT procedure; and
   a first parameter related to an uplink LBT procedure and a second parameter related to a downlink LBT procedure.

3. The method of claim 1, wherein:
   the first carrier is associated with a first frequency;
   the second carrier is associated with a second frequency;
   at least one of the first frequency and the second frequency is in an unlicensed spectrum.

4. The method of claim 1, wherein the at least one parameter related to the CCA procedure includes at least one of:
   a periodicity of an occurrence of time resources in which the wireless device can send the first uplink message on the second serving cell;
   a periodicity of an occurrence of time resources in downlink in which the wireless device is configured to operate in the first serving cell and the second serving cell;
   a delay uncertainty in acquiring a first available occasion for sending a second uplink message on the second serving cell, the second uplink message indicating a completion of the addition or release of the second serving cell;
   a periodicity of an occurrence of time resources in downlink in which the wireless device uses one or more signals for adding or releasing the second serving cell;
   a delay for obtaining a valid timing advance (TA) command for a timing advance group (TAG);
   a delay for applying a received TA command for transmission of the first uplink message on the second serving cell;
   a number of times the wireless device is unable to transmit the second uplink message on the second serving cell due to an uplink LBT failure on the second serving cell;
   an implementation margin of the wireless device;
   a periodicity of occasions for transmitting the second uplink message;
   a number of times the wireless device is unable to receive a second downlink transmission message on the second serving cell due to a DL LBT failure on the second serving cell;
   a periodicity of occasions or time resources in which the second serving cell can send a TA command for the second serving cell;
   a duration of discover signal occasion used for addition or release of the second serving cell;
   a periodicity of an occurrence of a plurality of discover signals used for addition or release of the second serving cell;
   a number of times at least one serving cell other than the first and second serving cell are requested to be added or released during the time period; and
   an interruption duration for adding or releasing the second serving cell.

5. The method of claim 1, wherein the first serving cell and the second serving cell are assigned to a primary timing advance group (pTAG).

6. The method of claim 1, wherein:
   the first serving cell is assigned to a pTAG; and
   the second serving cell is assigned to a secondary timing advance group (sTAG).

7. The method of claim 1, wherein the at least one parameter related to the CC procedure is selected from the group consisting of:
   a number of times a listen-before-talk (LBT) procedure fails on the second serving cell during the time period;
   a number of times the wireless device is unable to transmit the first uplink message on the second serving cell due to LBT failure on the second serving cell during the time period;
   a probability of LBT failure;
   a periodicity of the LBT procedure;
   a channel holding time after a successful LBT procedure or a maximum channel holding time; and
   a fairness of channel access.

8. A network node for performing addition or release of a serving cell, the network node comprising:
   processing circuitry configured to:
   transmit, to a wireless device, a first downlink message in a time resource, the wireless device being configured to operate in at least a first serving cell on a first carrier, the first downlink message requesting that the wireless device add or release a second serving cell on a second carrier;

within a time period starting from the time resource, receive, from the wireless device, a first uplink message indicating completion of the addition or release of the second serving cell, the first uplink message transmitted on the second serving cell; and perform at least one operational task based on the first uplink message, wherein the time period starting from the time resource is of a length that is a function of at least one parameter related to a clear channel assessment (CCA) procedure performed by the wireless device on the second serving cell during the time period.

9. The network node of claim 8, wherein at least one parameter related to the CCA procedure is selected from the group consisting of:
at first parameter related to an uplink LBT procedure;
a first parameter related to a downlink LBT procedure; and
a first parameter related to an uplink LBT procedure and a second parameter related to a downlink LBT procedure.

10. The network node of claim 8, wherein:
the first carrier is associated with a first frequency;
the second carrier is associated with a second frequency;
at least one of the first frequency and the second frequency is in an unlicensed spectrum.

11. The network node of claim 8, wherein the at least one parameter related to the CCA procedure is selected from the group consisting of:
a number of times a listen-before-talk (LBT) procedure fails on the second serving cell during the time period;
a number of times the wireless device is unable to transmit the first uplink message on the second serving cell due to LBT failure on the second serving cell during the time period;
a probability of LBT failure;
a periodicity of the LBT procedure;
a channel holding time after a successful LBT procedure or a maximum channel holding time; and
a fairness of channel access.

12. The network node of claim 8, wherein the at least one parameter related to the CCA procedure includes at least one of:
a periodicity of an occurrence of time resources in which the wireless device can send the first uplink message on the second serving cell;
a periodicity of an occurrence of time resources in downlink in which the wireless device is configured to operate in the first serving cell and the second serving cell;
a delay uncertainty in acquiring a first available occasion for sending a second uplink message on the second serving cell, the second uplink message indicating a completion of the addition or release of the second serving cell;
a periodicity of an occurrence of time resources in downlink in which the wireless device uses one or more signals for adding or releasing the second serving cell;
a delay for obtaining a valid timing advance (TA) command for a timing advance group (TAG);
a delay for applying a received TA command for transmission of the first uplink message on the second serving cell;
a number of times the wireless device is unable to transmit the second uplink message on the second serving cell due to an uplink LBT failure on the second serving cell;
an implementation margin of the wireless device;
a periodicity of occasions for transmitting the second uplink message;
a number of times the wireless device is unable to receive a second downlink transmission message on the second serving cell due to a DL LBT failure on the second serving cell;
a periodicity of occasions or time resources in which the second serving cell can send a TA command for the second serving cell;
a duration of discover signal occasion used for addition or release of the second serving cell;
a periodicity of an occurrence of a plurality of discover signals used for addition or release of the second serving cell;
a number of times at least one serving cell other than the first and second serving cell are requested to be added or released during the time period; and
an interruption duration for adding or releasing the second serving cell.

13. The network node of claim 8, wherein the at least one operational task comprises:
scheduling the wireless device on an uplink or a downlink in the second serving cell;
sending a scheduling grant to the wireless device to enable the wireless device to perform at least one of an uplink and a downlink transmission;
transmitting information about the first uplink transmission to another network node;
controlling a carrier aggregation configuration of the wireless device;
controlling a transmit power of the wireless device;
controlling an uplink timing in the wireless device;
performing a serving cell change;
performing a measurement configuration or reconfiguration of the wireless device; and
performing a positioning-related configuration or reconfiguration of the wireless device.

14. A wireless device for performing addition or release of a serving cell, the wireless device comprising:
processing circuitry configured to:
receive, from a network node, a first downlink message in a time resource, the wireless device being configured to operate in at least a first serving cell on a first carrier, the first downlink message requesting that a second serving cell on a second carrier be added or released;
in response to the first downlink message, add or release the second serving cell on the second carrier; and
within a time period starting from the time resource, transmit a first uplink message indicating completion of the addition or release of the second serving cell, the first uplink message transmitted on the second serving cell,
wherein the time period starting from the time resource is of a length that is a function of at least one parameter related to a clear channel assessment (CCA) procedure performed by the wireless device on the second serving cell during the time period.

15. The wireless device of claim 14, wherein at least one parameter related to the CCA procedure is selected from the group consisting of:
at first parameter related to an uplink LBT procedure;
a first parameter related to a downlink LBT procedure; and
a first parameter related to an uplink LBT procedure and a second parameter related to a downlink LBT procedure.

16. The wireless device of claim 14, wherein:
the first carrier is associated with a first frequency;
the second carrier is associated with a second frequency;
at least one of the first frequency and the second frequency is in an unlicensed spectrum.

17. The wireless device of claim 14, wherein the at least one parameter related to the CCA procedure includes at least one of:
a periodicity of an occurrence of time resources in which the wireless device can send the first uplink message on the second serving cell;
a periodicity of an occurrence of time resources in downlink in which the wireless device is configured to operate in the first serving cell and the second serving cell;
a delay uncertainty in acquiring a first available occasion for sending a second uplink message on the second serving cell, the second uplink message indicating a completion of the addition or release of the second serving cell;
a periodicity of an occurrence of time resources in downlink in which the wireless device uses one or more signals for adding or releasing the second serving cell;
a delay for obtaining a valid timing advance (TA) command for a timing advance group (TAG);
a delay for applying a received TA command for transmission of the first uplink message on the second serving cell;
a number of times the wireless device is unable to transmit the second uplink message on the second serving cell due to an uplink LBT failure on the second serving cell;
an implementation margin of the wireless device;
a periodicity of occasions for transmitting the second uplink message;
a number of times the wireless device is unable to receive a second downlink transmission message on the second serving cell due to a DL LBT failure on the second serving cell;
a periodicity of occasions or time resources in which the second serving cell can send a TA command for the second serving cell;
a duration of discover signal occasion used for addition or release of the second serving cell;
a periodicity of an occurrence of a plurality of discover signals used for addition or release of the second serving cell;
a number of times at least one serving cell other than the first and second serving cell are requested to be added or released during the time period; and
an interruption duration for adding or releasing the second serving cell.

18. The wireless device of claim 14, wherein the at least one parameter related to the CC procedure is selected from the group consisting of:
a number of times a listen-before-talk (LBT) procedure fails on the second serving cell during the time period;
a number of times the wireless device is unable to transmit the first uplink message on the second serving cell due to LBT failure on the second serving cell during the time period;
a probability of LBT failure;
a periodicity of the LBT procedure;
a channel holding time after a successful LBT procedure or a maximum channel holding time; and
a fairness of channel access.

19. A method by a network node for performing addition or release of a serving cell, the method comprising:
transmitting, to a wireless device, a first downlink message in a time resource, the wireless device being configured to operate in at least a first serving cell on a first carrier, the first downlink message requesting that the wireless device add or release a second serving cell on a second carrier;
within a time period starting from the time resource, receiving, from the wireless device, a first uplink message indicating completion of the addition or release of the second serving cell, the first uplink message transmitted on the second serving cell; and
performing at least one operational task based on the first uplink message,
wherein the time period starting from the time resource is of a length that is a function of at least one parameter related to a clear channel assessment (CCA) procedure performed by the wireless device on the second serving cell during the time period.

20. The method of claim 19, wherein the first serving cell and the second serving cell are assigned to a primary timing advance group (pTAG).

21. The method of claim 19, wherein:
the first serving cell is assigned to a pTAG; and
the second serving cell is assigned to a secondary timing advance group (sTAG).

22. The method of claim 19, wherein the at least one parameter related to the CCA procedure is selected from the group consisting of:
a number of times a listen-before-talk (LBT) procedure fails on the second serving cell during the time period;
a number of times the wireless device is unable to transmit the first uplink message on the second serving cell due to LBT failure on the second serving cell during the time period;
a probability of LBT failure;
a periodicity of the LBT procedure;
a channel holding time after a successful LBT procedure or a maximum channel holding time; and
a fairness of channel access.

23. The method of claim 19, wherein the at least one parameter related to the CCA procedure includes at least one of:
a periodicity of an occurrence of time resources in which the wireless device can send the first uplink message on the second serving cell;
a periodicity of an occurrence of time resources in downlink in which the wireless device is configured to operate in the first serving cell and the second serving cell;
a delay uncertainty in acquiring a first available occasion for sending a second uplink message on the second serving cell, the second uplink message indicating a completion of the addition or release of the second serving cell;
a periodicity of an occurrence of time resources in downlink in which the wireless device uses one or more signals for adding or releasing the second serving cell;
a delay for obtaining a valid timing advance (TA) command for a timing advance group (TAG);
a delay for applying a received TA command for transmission of the first uplink message on the second serving cell;
a number of times the wireless device is unable to transmit the second uplink message on the second serving cell due to an uplink LBT failure on the second serving cell;
an implementation margin of the wireless device;

a periodicity of occasions for transmitting the second uplink message;

a number of times the wireless device is unable to receive a second downlink transmission message on the second serving cell due to a DL LBT failure on the second serving cell;

a periodicity of occasions or time resources in which the second serving cell can send a TA command for the second serving cell;

a duration of discover signal occasion used for addition or release of the second serving cell;

a periodicity of an occurrence of a plurality of discover signals used for addition or release of the second serving cell;

a number of times at least one serving cell other than the first and second serving cell are requested to be added or released during the time period; and an interruption duration for adding or releasing the second serving cell.

24. The method of claim 23, wherein at least one parameter related to the CCA procedure is selected from the group consisting of:

at first parameter related to an uplink LBT procedure;

a first parameter related to a downlink LBT procedure; and a first parameter related to an uplink LBT procedure and a second parameter related to a downlink LBT procedure.

25. The method of claim 19, wherein:

the first carrier is associated with a first frequency;

the second carrier is associated with a second frequency;

at least one of the first frequency and the second frequency is in an unlicensed spectrum.

26. The method of claim 19, wherein the at least one operational task comprises:

scheduling the wireless device on an uplink or a downlink in the second serving cell;

sending a scheduling grant to the wireless device to enable the wireless device to perform at least one of an uplink and a downlink transmission;

transmitting information about the first uplink transmission to another network node;

controlling a carrier aggregation configuration of the wireless device;

controlling a transmit power of the wireless device;

controlling an uplink timing in the wireless device;

performing a serving cell change;

performing a measurement configuration or reconfiguration of the wireless device; and performing a positioning-related configuration or reconfiguration of the wireless device.

* * * * *